United States Patent [19]

Yoshimura et al.

[11] Patent Number: 4,709,943
[45] Date of Patent: Dec. 1, 1987

[54] KNEE PROTECTOR STRUCTURE FOR VEHICLE

[75] Inventors: Toshiteru Yoshimura; Takayuki Kobayashi; Masayoshi Ono, all of Hiroshima, Japan

[73] Assignee: Mazda Motor Corporation, Japan

[21] Appl. No.: 885,675

[22] Filed: Jul. 15, 1986

[30] Foreign Application Priority Data

| Jul. 17, 1985 | [JP] | Japan | 60-158828 |
| Jul. 24, 1985 | [JP] | Japan | 60-114287 |
| Jul. 29, 1985 | [JP] | Japan | 60-117041 |
| Jul. 29, 1985 | [JP] | Japan | 60-117042 |

[51] Int. Cl.⁴ .................................. B60R 21/04
[52] U.S. Cl. ........................... 280/751; 180/90; 280/752
[58] Field of Search ............... 280/748, 751, 752; 296/194; 180/90

[56] References Cited

U.S. PATENT DOCUMENTS

| 3,897,848 | 8/1975 | Arnstson et al. | 180/90 |
| 3,938,821 | 2/1976 | Haas et al. | 180/90 |
| 3,947,056 | 3/1976 | Schwanz | 180/90 |
| 3,951,429 | 4/1976 | Satzinger | 280/751 |
| 3,984,128 | 10/1976 | Oehm et al. | 180/90 |
| 4,317,582 | 3/1982 | Cottin | 280/751 |
| 4,349,214 | 9/1982 | Inasawa et al. | 180/90 |
| 4,368,901 | 1/1983 | Kojima | 180/90 |
| 4,400,011 | 8/1983 | Matsuno | 280/751 |
| 4,421,343 | 12/1983 | Yoshitsugu et al. | 180/90 |
| 4,427,215 | 1/1984 | Weichenrieder et al. | 180/90 |
| 4,518,172 | 5/1985 | Bortz et al. | 180/90 |

FOREIGN PATENT DOCUMENTS

| 51-7635 | 3/1975 | Japan . |
| 51-25078 | 6/1976 | Japan . |
| 51-48120 | 11/1976 | Japan . |

*Primary Examiner*—Richard A. Bertsch
*Attorney, Agent, or Firm*—Gerald J. Ferguson, Jr.; Michael P. Hoffman; Michael J. Foycik, Jr.

[57] ABSTRACT

A knee protector structure comprises a transverse frame member extending in the transverse direction of a vehicle body below an instrument panel provided in front of the front seat, a center bracket an upper portion of which is connected to a body panel in front of the front seat substantially at the middle between right and left sides and a lower portion of which is connected to the floor of the vehicle body. The frame member is connected to the cabside at an outer end portion and to the center bracket at an inner end portion. A knee pad is supported by a bracket member connected to the frame member at a front end portion and to the knee pad at a rear end portion.

28 Claims, 11 Drawing Figures

KNEE PROTECTOR STRUCTURE FOR VEHICLE

BACKGROUND OF THE INVENTION

1. Field of the Invention

This invention relates to a knee protector structure for a vehicle, and more particularly to a structure of a knee protector for stopping the knees of a passenger to prevent the passenger from hitting against the dashboard or the like upon collision.

2. Description of the Prior Art

There has been provided in a vehicle a knee protector in order to stop the knees of a passenger upon collision, thereby preventing the passenger from further moving forward and protecting the passenger from hitting against the dashboard or the like. The knee protector must have a certain extent of rigidity in order to successfully carry out its function. However, conventional knee protectors are insufficient in rigidity. For example, the knee protector disclosed in Japanese Utility Model Publication No. 51(1976)-48120 merely comprises a stay simply attached to the vehicle body and a thin cover member extending between the stay and the lower portion of the instrument panel, and does not have a rigidity sufficient to successfully function as a knee protector.

SUMMARY OF THE INVENTION

In view of the foregoing observations and description, the primary object of the present invention is to provide a knee protector structure for a vehicle in which a rigidity sufficient for successfully performing the function as the knee protector can be ensured.

Another object of the present invention is to provide a knee protector structure which is low in weight and simple in structure and is provided with a shock absorbing function.

The knee protector structure in accordance with the present invention comprises a transverse frame member extending in the transverse direction of the vehicle body below an instrument panel provided in front of the front seat, a center bracket an upper portion of which is connected to a body panel in front of the front seat substantially at the middle between right and left sides and a lower portion of which is connected to the floor of the vehicle body, said frame member being connected to the cabside at an outer end portion and to the center bracket at an inner end portion, and a knee pad supported by a bracket member connected to the frame member at a front end portion and to the knee pad at a rear end portion.

With this arrangement, the supporting rigidity for the knee pad is substantially improved so as to be sufficient to successfully protect the passenger since the knee pad is connected to the cabside by way of the frame member and to the body panel and the floor by way of the frame member and the center bracket.

BRIEF DESCRIPTION OF THE DRAWINGS

FIG. 3 is an enlarged cross-sectional view of a part of FIG. 1.

DESCRIPTION OF THE PREFERRED EMBODIMENTS

Figure 1:
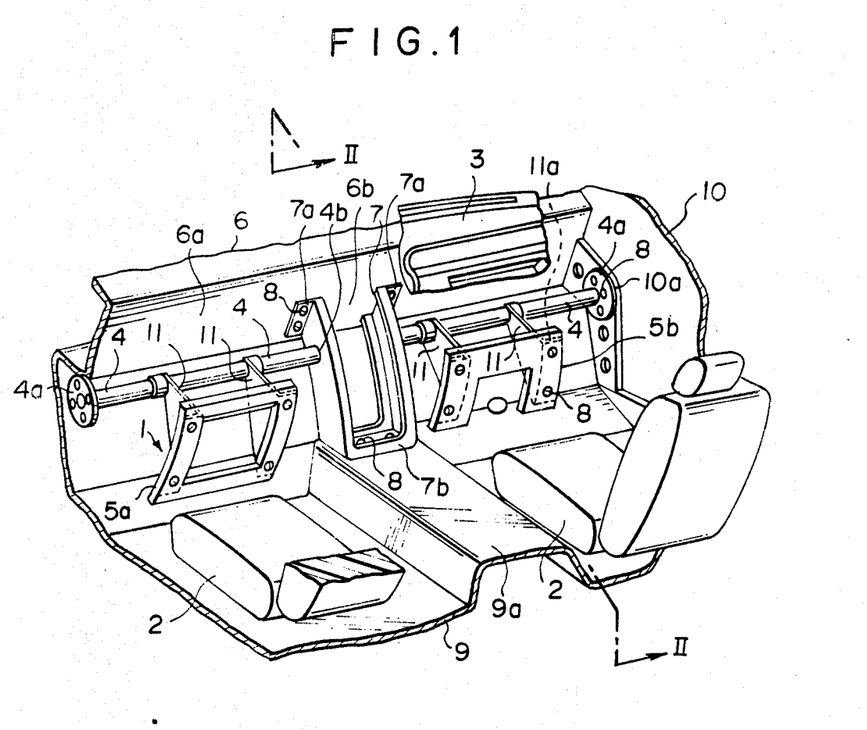
FIG. 1 is a fragmentary perspective view showing a knee protector structure in accordance with an embodiment of the present invention with the instrument panel removed.

In FIG. 1, there are shown left and right knee protector structures 1 in accordance with an embodiment of the present invention. The left and right knee protector structures 1 are substantially the same and accordingly only one of them will be mainly described hereinbelow. The knee protector structure 1 includes a frame member 4 extending in the transverse direction of the vehicle body below an instrument panel 3 in front of a front seat 2, and a center bracket 7 fixed to a dashboard upper panel 6a (which is a part of a body panel 6 in front of the front seat 2) and the top wall of a tunnel 9a (which is a part of a floor 9 of the vehicle body). The frame member 4 is of a steel pipe and is connected to the center bracket 7 at the inner end and to a cabside 10 at the outer end as will be described in more detail later. A knee pad is supported by the frame member 4 by way of a pair of brackets 11. The knee pads of the left and right knee protector structures are different from each other in shape and respectively indicated at 5a and 5b. They will be referred to as "the knee pad 5" in common so long as the description is made on features common to both knee pads.

The center bracket 7 is substantially U-shaped and comprises a horizontal portion and a pair of vertical portions extending upward from opposite ends of the horizontal portion. An upper mounting portion 7a is formed on the upper end of each vertical portion and a lower mounting portion 7b is formed in the horizontal portion. The upper mounting portions 7a of the center bracket 7 are fixed to the middle portion 6b of the dashboard upper panel 6a by screws 8 and the lower mounting portion 7b of the center bracket 7 is fixed to the top wall of the tunnel 9a by screws 8.

The frame member 4 is provided with a mounting flange at the outer end 4a and the mounting flange is fixed to a bracket 10a forming a part of the cabside 10 by screws 8. The inner end 4b of the frame member 4 is welded to one of the vertical portions of the center bracket 7.

A pair of brackets 11 are welded to the frame member at their front ends. Each bracket 11 is provided with a mounting portion 11a at the rear end and the mounting portion 11a is fixed to the knee pad 5 by screws 8. The left knee pad 5a is like a rectangular frame having right and left sides and upper and lower sides. On the other hand the right knee pad 5b is like a channel-shaped frame having right and left sides and an upper side but having no lower side. The reason for the difference in shape between the left and right knee pads 5a and 5b will be apparent from the following. The knee pad 5 is covered with a knee pad cover which is not shown.

Figure 4:
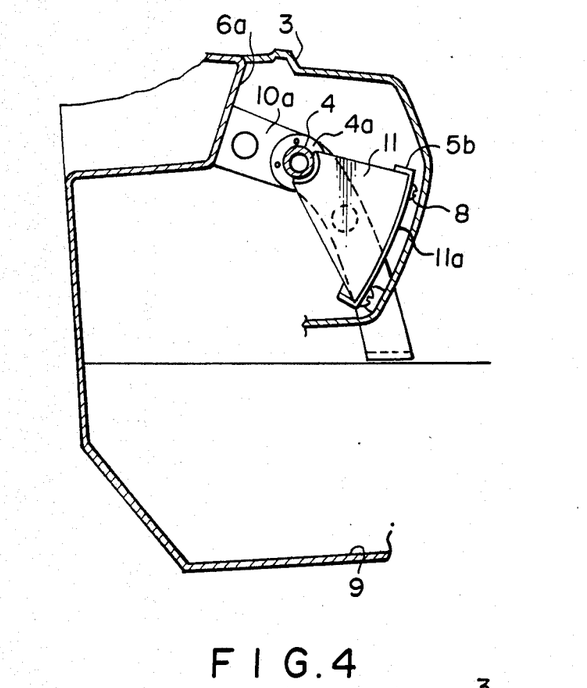
FIG. 4 is a fragmentary perspective view showing the appearance of the instrument panel covering the structure of FIG. 1.
Figure 5:
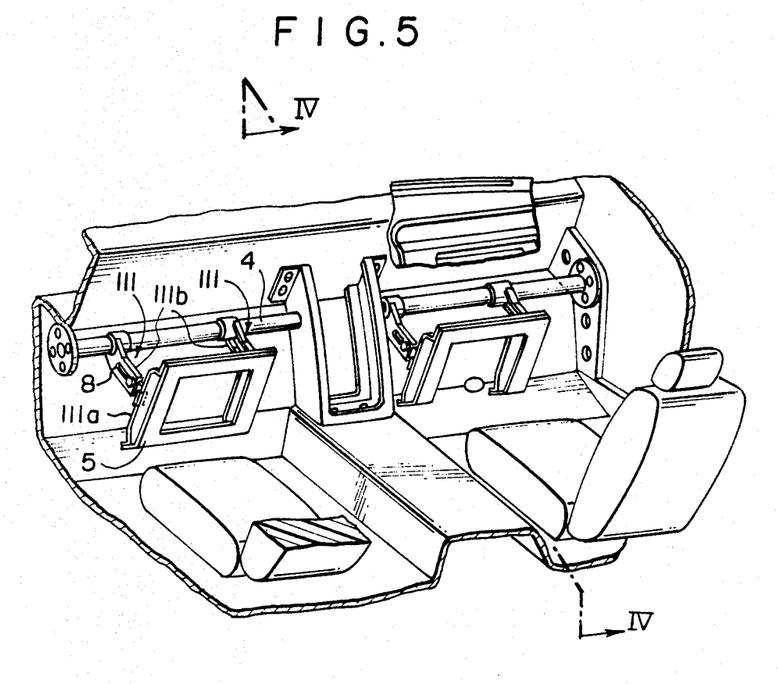
FIG. 5 is a view similar to FIG. 1 but showing another embodiment of the present invention.
Figure 6:
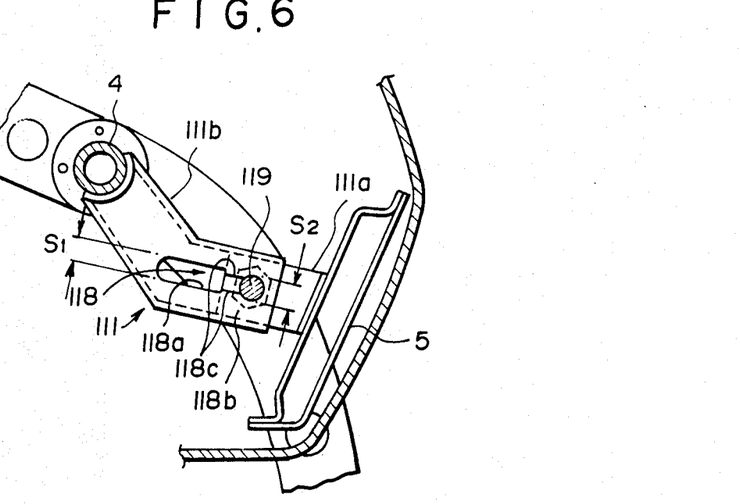
FIG. 6 is an enlarged fragmentary view showing the bracket employed in the knee protector structure shown in FIG. 5.
Figure 7:
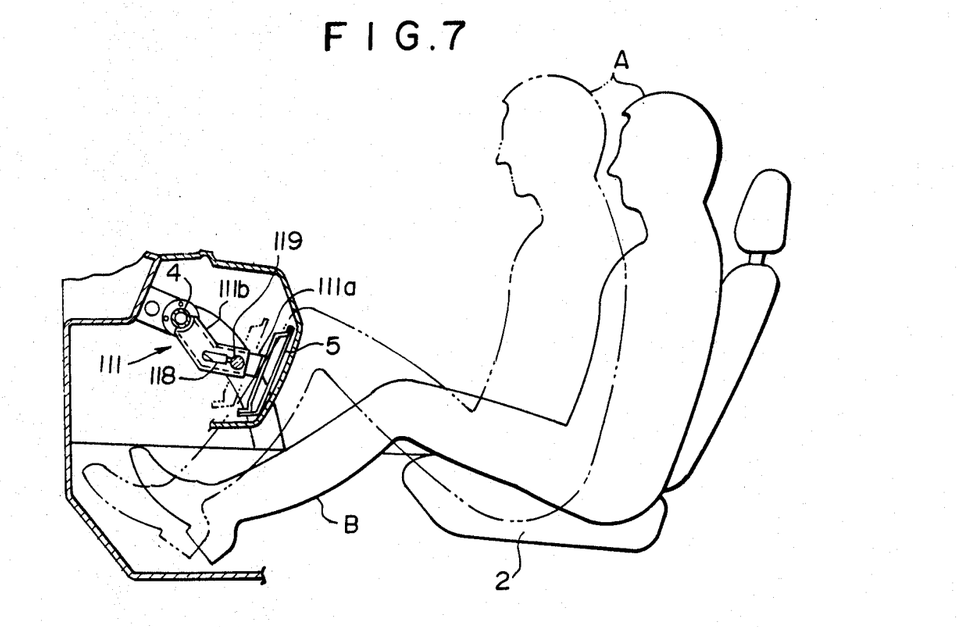
FIG. 7 is a cross-sectional view taken along line VII—VII in FIG. 5.

As clearly shown in FIGS. 3 and 4, the instrument panel 3 covers the dashboard upper panel 6a from behind, and the left knee pad 5a defines a space for forming a glove box 12 while the right knee pad 5b defines an opening through which the steering column 13 extends.

Figure 2:
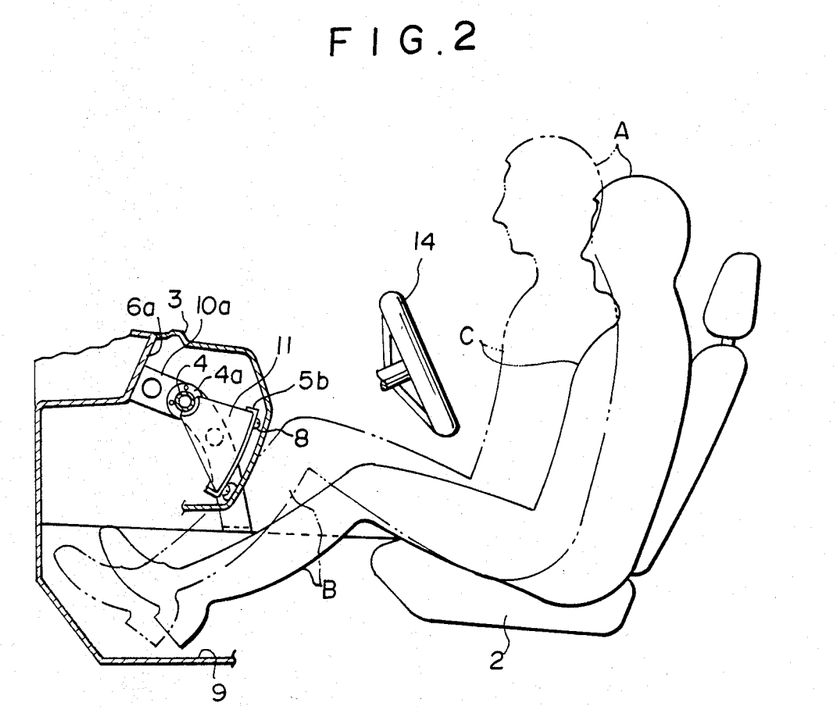
FIG. 2 is a cross-sectional view taken along line II—II in FIG. 1.

When the vehicle is abruptly stopped, and the passenger A (FIG. 2) is moved forward due to inertia, the knees B of the passenger A first hit against the knee pad 5 from over the instrument panel 3. Since the knee pad 5 is supported by the cabside 10, the body panel 6 and the floor 9 by way of the brackets 11, the frame member 4 and the center bracket 7, the supporting rigidity for the knee pad 5 is sufficient to prevent the passenger A from further moving forward, thereby helping to prevent his chest from hitting against the steering wheel 14 (FIG. 2).

Though in the embodiment described above the brackets 11 for connecting the knee pad 5 to the frame member 4 are rigid members, they may be collapsible members able to function as shock absorbers.

In the second embodiment shown in FIGS. 5 to 8, each of a pair of brackets 111 for connecting the knee pad 5 to the frame member 4 comprises first and second portions 111a and 111b. The first portion 111a is welded to the knee pad 5 at the rear end and extends forward toward the frame member 4. The second portion 111b is welded to the frame member 4 at the front end and extend rearward toward the knee pad 5. The second portion 111b is provided with a slit 118 comprising a front portion 118a and a rear portion 118b which is wider than the front portion 118a. A pair of projections 118c project inward to form a stopper shoulder facing rearward, the purpose of which will become apparent later. The second portion 111b is channel-shaped in cross section and the front end portion of the first portion 111a is received in the channel. The first portion 111a is provided with a bolt hole (not shown) and a bolt 119 is inserted into the bolt hole and the rear portion 118b of the slit 118 and is tightened to fix together the first and second portions 118a and 111b of the bracket 111. The width Sl of the front portion 118a of the slit 118 is smaller than the thickness of the bolt 119 and the width S2 of the rear portion 118b of the slit 118 is larger than the thickness of the bolt 119. The projections 118c normally confine the bolt 119 in the rear portion 118b.

Figure 8:
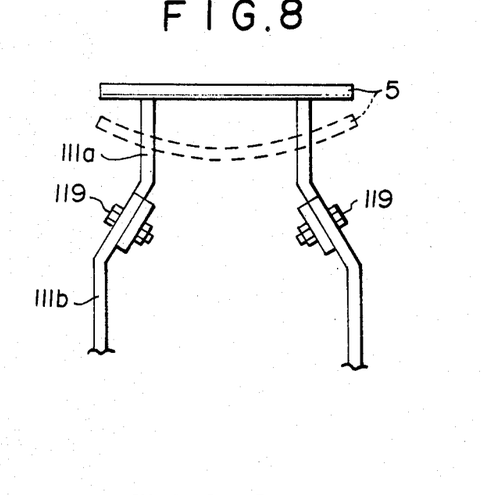
FIG. 8 is a fragmentary plan view of a part of the structure.

When the passenger's knees B hit against the knee pad 5 upon collision, the knee pad 5 itself is slightly deformed as shown by the dotted line in FIG. 8 and at the same time is moved forward. When the knee pad 5 is moved forward, the bolt 119 is pushed forward deforming the projections 118c toward the front portion 118a of the slit 118 having a width smaller than the thickness of the bolt 119 and is forced into the front portion 118a expanding it. Thus the energy exerted on the knee pad 5 by the passenger's knees B upon collision is absorbed by the two-stage resistance restraining the bolt 119 from moving forward, whereby the impact on the passenger's knees can be relieved.

This arrangement is advantageous in that shock absorbing effect can be obtained with a simple structure without narrowing the space for the passenger's lower limbs.

Figure 9:
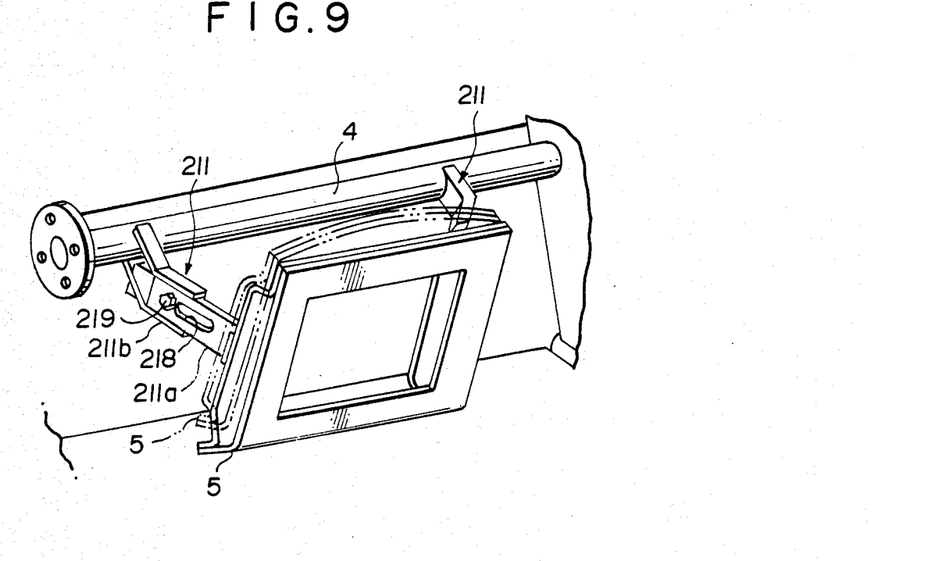
FIG. 9 is a perspective view showing a modification of the bracket which can be employed in the present invention.

In the modification shown in FIG. 9, the knee pad 5 is supported by a pair of non-parallel brackets 211. Each bracket 211 comprises a first portion 211a and a second portion 211b. The first portions 211a are welded to the knee pad 5 and extend obliquely toward the frame member 4 to diverge away from each other toward the frame member 4. The second portions 211b are welded to the frame member 4 and extend obliquely toward the knee pad 5 to converge toward each other. A slit 218 similar to the slit 118 formed in the second portion 111b of the bracket 111 is formed in the first portion 211a of the bracket 211 and the first and second portions 211a and 211b are fixed together by a bolt 219 in a manner similar to the embodiment shown in FIGS. 5 to 8. In this modification, the energy exerted on the knee pad 5 by the passenger's knees B upon collision is further absorbed by the brackets being forced away from each other and by the knee pad 5 being bowed as shown by the chained line in FIG. 9.

In the embodiment shown in FIGS. 5 to 8 and the modification thereof shown in FIG. 9, the slits (118, 218) may be formed either in the first portion or the second portion of the bracket, and as the member for fixing together the first and second portions of the bracket, other fastening means such as a rivet can be used instead of the bolt.

Figure 10:
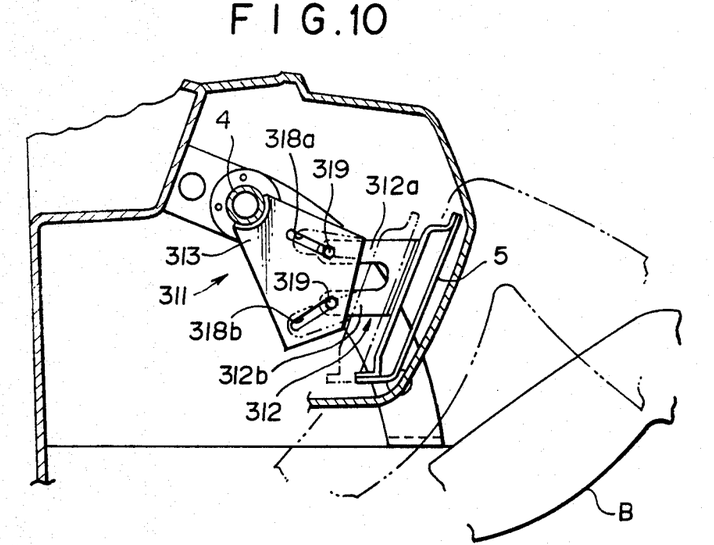
FIG. 10 is a side view showing another modification of the bracket.

FIG. 10 shows another modification of the brackets for connecting the knee pad 5 to the frame member 4.

In FIG. 10, the bracket 311 of this modification comprises a first portion 312 and a second portion 313. The first portion 312 is welded to the knee pad 5 at the rear end portion and the front end portion of the first portion 312 is bifurcated to form a pair of arms 312a and 312b. The second portion 313 is welded to the frame member 4 at the front end portion and a pair of slits 318a and 318b are formed in the rear end portion of the second portion 313. The slits 318a and 318b are vertically spaced from each other and obliquely extend to diverge away from each other toward the frame member 4. The first and second portions 312 and 313 are fixed together by a pair of bolts 319 extending through the slits 318a and 318b. The width of the slits 318a and 318b are so selected that a certain resistance is generated when the bolts 319 are inserted thereinto.

When the knee pad 5 is forced forward by the passenger's knees upon collision, the bolts 319 are forced forward along the slits 318a and 318b which diverge away from each other toward the front of the vehicle body, whereby the arms 312a and 312b of the first portion 312 are forced away from each other. The resistance to the sliding movement of the bolts 319 along the slits 318a and 318b and the counterforce against the deformation of the arms 312a and 312b absorb the energy exerted on the knee pad 5 by the passenger's knee upon collision.

In contrast with this modification, the slits may be formed in the first portion of the bracket and the rear end portion of the second portion may be bifurcated. Further, the slits may diverge away from each other toward the rear or the knee pad 5.

Figure 11:
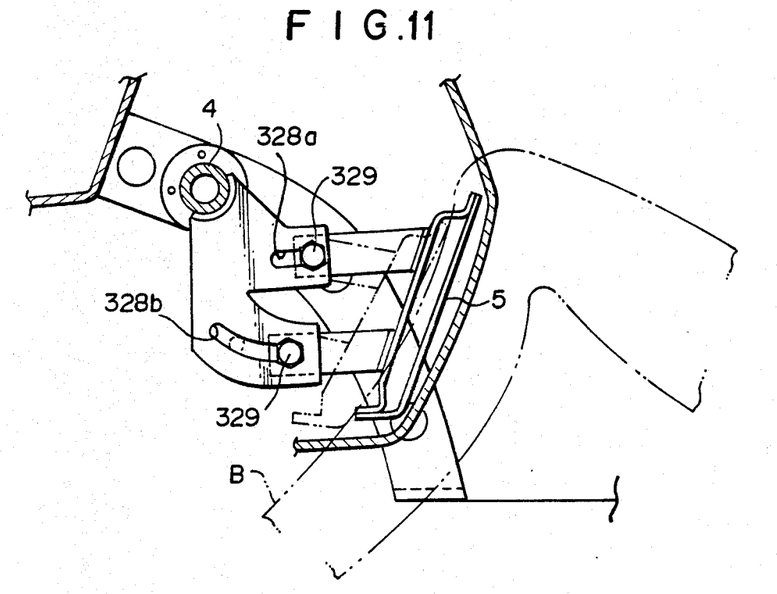
FIG. 11 is a side view showing still another modification of the bracket.

Still another modification of the bracket shown in FIG. 11 is very similar to the modification shown in FIG. 10 except that an upper slit 328a horizontally extends straight while a lower slit 328b is arcuated to form a part of a circle having its center on the front end of the upper slit 328a.

In this case, the knee pad 5 first slides along the slits 328a and 328b until the bolt 329 inserted into the upper slit 328a abuts against the front end of the upper slit 328a, then clockwisely rotates about the bolt 329. The resistance to the sliding movement of the bolts 329 along the slits 328a and 328b and to the rotational movement of the knee pad 5 absorbs the energy exerted on the knee pad 5 by the passenger's knees upon collision. A bolt hole may be used instead of the upper slit 328a.

We claim:

1. A knee protector structure for a vehicle comprising a transverse frame member extending in the transverse direction of the vehicle body below an instrument panel provided in front of the front of the front seat, bracket an upper portion of which is connected to a body panel in front of the front seat substantially at the middle between right and left sides of the vehicle body and a lower portion of which is connected to the floor of the vehicle body, said frame member being connected to the cabside at an outer end portion and to the center bracket at an inner end portion, and a knee pad supported by a bracket member connected to the frame member at a front end portion and to the knee pad at a rear end portion, said bracket for supporting the knee pad comprising a first portion connected to the knee pad at a rear end portion and a second portion connected to the frame member at a front end portion, the first and second portions being connected together by a mounting member passed through a slit formed in one of the first and second portions.

2. A knee protector structure as defined in claim 1 in which the upper portion of the center bracket is connected to a dashboard upper panel and the lower portion of the same is connected to the upper wall of a tunnel portion of the floor of the vehicle body.

3. A knee protector structure as defined in claim 2 in which said center bracket comprises a pair of spaced vertical portions and a horizontal portion connecting the lower ends of the vertical portions, the upper ends of the vertical portions being connected to the dashboard upper panel, the horizontal portion being connection to the upper wall of the tunnel and the inner end portion of the frame member being connected to one of the vertical portions.

4. A knee protector structure as defined in claim 1 in which said mounting member is a bolt and said slit is formed in the first portion, the width of the slit being larger than the diameter of the bolt at the front portion thereof but being smaller than the same at the rear portion thereof.

5. A knee protector structure as defined in claim 4 in which a stopper projection projects inward at an intermediate portion of the slit between the front portion and the rear portion.

6. A knee protector structure as defined in claim 1 in which said mounting member is a bolt and said slit is formed in the second portion, the width of the slit being larger than the diameter of the bolt at the rear portion thereof but being smaller than the same at the front portion thereof.

7. A knee protector structure as defined in claim 6 in which a stopper projection projects inward at an intermediate portion of the slit between the front portion and the rear portion.

8. A knee protector structure as defined in claim 1 in which said knee pad is supported by a pair of said brackets and the first portions of the brackets extend forward diverging away from each other at least at the front end portions, the second portions of the brackets extending along the front end portions of the corresponding first portions at least at the rear end portions.

9. A knee protector structure as defined in claim 8 in which said mounting member is a bolt and said slit is formed in the first portion of each bracket, the width of the slit being larger than the diameter of the bolt at the front portion thereof but being smaller than the same at the rear portion thereof.

10. A knee protector structure as defined in claim 1 in which said knee pad is supported by a pair of said brackets spaced from each other in the transverse direction of the vehicle body.

11. A knee protector structure as defined in claim 1 in which said bracket for supporting the knee pad comprises a first portion connected to the knee pad at a rear end portion and a second portion connected to the frame member at a front end portion, the free end portion of one of the first and second portions being bifurcated to form a pair of arm portions, the free end portion of the other portion being provided with a pair of slits diverging from each other, and each of the arm portions being fixed to the other portion by a mounting member passed through one of the slits.

12. A knee protector structure as defined in claim 11 in which the free end portion of the first portion is bifurcated and the free end portion of the second portion is provided with the slits.

13. A knee protector structure as defined in claim 12 in which the pair of slits diverge away from each other toward the frame member.

14. A knee protector structure as defined in claim 1 in which said bracket for supporting the knee pad comprises a first portion connected to the knee pad at a rear end portion and a second portion connected to the frame member at a front end portion, the front end portion of the first portion being bifurcated to form upper and lower arm portions, the upper arm portion being connected to the the rear end portion of the second portion by a mounting member at a predetermined mounting position, the rear end portion of the second portion being provided with an arcuate slit the center of whose curvature is on the mounting position and the lower arm portion being connected to the rear end portion of the second portion by a mounting member passed through the slit.

15. A knee protector structure as defined in claim 14 in which said mounting member for connecting the upper arm portion to the rear end portion of the second portion is passed through a slit formed in the second portion.

16. A knee protector structure as defined in claim 1 in which said frame member is of a pipe-like shape.

17. A knee protector structure as defined in claim 1 in which said frame member is connected to the cowl side by way of a bracket connecting the floor with the dashboard upper panel.

18. A knee protector structure for a vehicle comprising a transverse frame member extending in the transverse direction of the vehicle body below an instrument panel provided in front of the front seat, a center bracket an upper portion of which is connected to a body panel in front of the front seat substantially at the middle beteween right and left sides of the vehicle body and a lower portion of which is connected to the floor of the vehicle body, said frame member being connected to the cabside at an outer end portion and to the center bracket at an inner end portion, and a knee pad supported by a bracket member connected to the frame member at a front end portion and to the knee pad at a rear end portion, said bracket for supporting the knee pad comprising a first portion connected to the knee pad at a rear end portion and a second portion connected to the frame member at a front end portion, the first and second portions being connected together by a mounting member passed through a slit formed in one of the first and second portions, said structure further comprising a stopper projection which projects at the slit in the direction of shock movement of the mounting member.

19. A knee protector structure as defined in claim 18 in which said mounting member is a bolt and said slit is formed in the first portion, the width of the slit being larger than the diameter of the bolt at a front portion thereof but being smaller than the same at a rear portion thereof.

20. A knee protector sturucture as defined in claim 19 in which a stopper projection projects inward at an intermediate portion of the slit between the front portion and the rear portion.

21. A knee protector structure as defined in claim 18 in which said mounting member is a bolt and said slit is formed in the second portion, the width of the slit being larger than the diameter of the bolt at a rear portion thereof but being smaller than the same at a front portion thereof.

22. A knee protector structure as defined in claim 21 in which a stopper projection projects inward at an intermediate portion of the slit between the front portion and the rear portion.

23. A knee protector structure for a vehicle comprising a transverse frame member having a closed cross-section and extending in the transverse direction of the vehicle body below an instrument panel provided in front of the front seat, a center bracket an upper portion of which is connected to a body panel in front of the front seat substantially at the middle between right and left sides of the vehicle body and a lower portion of which is connected to the floor of the vehicle body, said frame member being connected to the cabside at an outer end portion and to the center bracket at an inner end portion, and a knee pad supported by a bracket member connected to the frame member at a front end portion and to the knee pad at a rear end portion, said knee pad being supported by a pair of said brackets spaced from each other in the transverse directions of the vehicle body, wherein a channel-shaped structure is formed by the cowl side and the frame member and the center bracket.

24. A knee protector structure as defined in claim 23 in which said frame member is of a pipe-like shape.

25. A knee protector structure as defined in claim 23 in which said frame member is connected to the cowl side by way of a bracket connecting the floor with the dashboard upper panel.

26. A knee protector structure as defined in claim 23 in which a pair of said brackets are of a fan shape projecting rearward from the portion connected with said frame member, the rear end faces of said brackets being vertically connected to the respective side ends of the knee pad.

27. A knee protector structure as defined in claim 23 in which the upper portion of the center bracket is connected to a dashboard upper panel and the lower portion of the same is connected to the upper wall of a tunnel portion of the floor of the vehicle body.

28. A knee protector structure as defined in claim 27 in which said center bracket comprises a pair of spaced vertical portions and a horizontal portion connecting the lower ends of the vertical portions, the upper ends of the vertical portions being connected to the dashboard upper panel, the horizontal portion being connected to the upper wall of the tunnel and the inner end portion of the frame member being connected to one of the vertical portions.

* * * * *